Aug. 28, 1962  J. DE LOS SANTOS GONZALEZ  3,051,209
MANUFACTURE OF CONTAINERS MADE OF
PLASTIC MATERIALS OR THE LIKE
Filed April 1, 1960
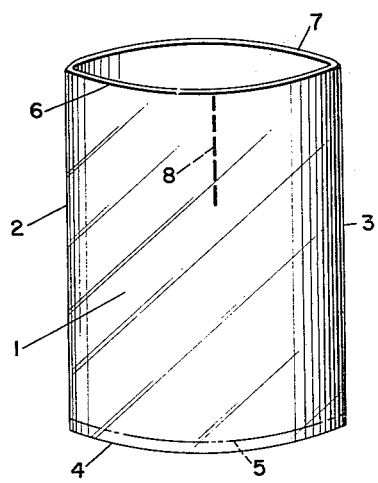
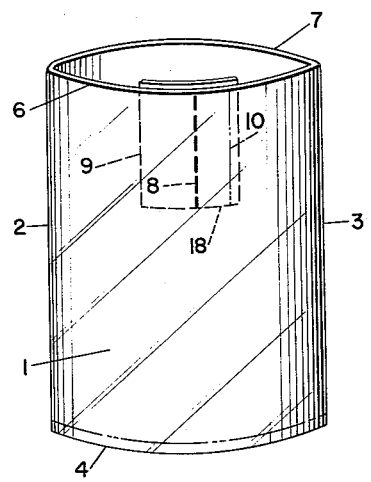
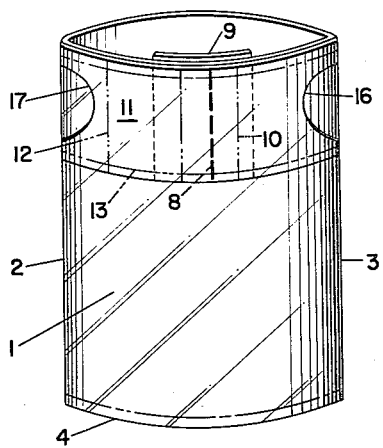
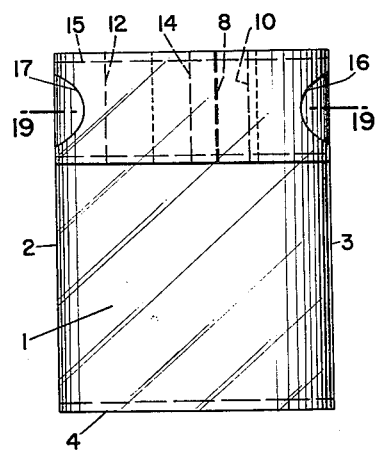
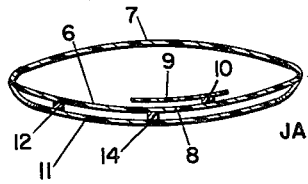
INVENTOR
JACQUES DE LOS SANTOS GONZALEZ
BY Fred C. Philpitt
ATTORNEY United States Patent Office 3,051,209
Patented Aug. 28, 1962

3,051,209
MANUFACTURE OF CONTAINERS MADE OF PLASTIC MATERIALS OR THE LIKE
Jacques de los Santos Gonzalez, De Pinte, Belgium, assignor to Societe Financiere de la Cellulose, Luxembourg, Grand Duche de Luxembourg
Filed Apr. 1, 1960, Ser. No. 19,292
1 Claim. (Cl. 150—9)

This invention relates to containers or bags made of plastic materials, and more particularly of polyethylene.

The invention has for its object a method of production of a container or bag suitable for liquid, pulverulent or granular substances, even of heavy weight, said container being made of plastic materials, being simple and economical to make, capable of being filled by mechanical means, being self closing when filled and having excellent properties of mechanical resistance. The invention also covers the finished container or bag.

The process for the manufacture of a container or bag according to the present invention is characterized in that use is made of a casing of plastic material which has been closed or will be finally closed upon three of its sides and which has temporarily been left open on its fourth side, a slit is cut down along part of the depth of the front wall of the casing from its opening, a sheet is applied behind the slit against the front wall of the casing, said sheet being fixed along its entire width at one side edge and also at its upper and lower sides, to the said front wall of the casing and remaining free or non-fixed relatively to the front wall at that place where the slit has been cut and along its remaining surface on one side of the latter, so as to allow a passage of a tube into the container or bag through the slit to feed the substance into the container or bag.

Preferably, a band of plastic material is applied upon the front face of the casing (the one which has been slit), which band covers the slit and is fixed at its lower part on its entire length and is fixed at its upper part (towards the opening) jointly with the upper edge of the front wall of the casing, with the above described sheet and with the upper edge of the rear wall of the casing, thereby forming a thick upper edge which closes the container with a tight fit and is highly resistant to tear.

Preferably, the sheet is made of a plastic material which is thinner than the layer or layers forming the casing.

Preferably also, the slit is formed, not along the middle line of the front face of the casing, but along a line situated between the middle part of the casing and a side edge of the casing. Such an arrangement facilitates the filling operation.

The band may be provided with one or both side edges of arcuate shape in order to facilitate the introduction of the feeding tube into the container, and also to prevent the operator from passing his hands underneath the reinforcing band when lifting the container, risking thus to tear the latter.

The casing may be formed of one layer or of several superposed layers of plastic material.

Referring to the accompanying drawings,

FIGURE 1 shows one of the phases of the manufacture of a container according to the invention.

FIGURE 2 shows another phase of said manufacture.

FIGURE 3 shows another phase of the manufacture, and

FIGURE 4 shows still another phase of the manufacture.

FIGURE 5 is a cross-section made along the line 19—19 of FIGURE 4.

The same parts are shown by the same reference numeral in the various figures of the drawings.

Referring to the drawings, 1 is a casing or bag made of a plastic material, preferably of polyethylene, the edges 2, 3 and 4 of which are closed by any suitable means either before, or after the formation of the container or bag as hereinafter described. The edges 2 and 3 may even be mere folds of the plastic material formed during the manufacture of the bag from a tubular casing or a lay-flat tubing, while the edge 4 forming the bottom of the bag is sealed at 5.

Let us consider a container in which the front edge of the opening is shown by the reference numeral 6 and the rear edge is shown by the reference numeral 7. A slit 8 is cut in the front wall of the casing (FIGURE 1) along a few centimeters for instance. Behind the slit, a sheet 9 of plastic material is applied, said sheet being preferably made of a thinner material than the material of which the container itself is made, and being sealed to the front face of the container or being fixed thereto by a plurality of alined sealing points 10 (FIGURE 2). It should be noted that the slit has been made at a place between the middle line of the front face of the container and the side edge 3.

The sheet 9 is also fixed to the front wall of the container along the entire width of its edge 18, away from the opening.

Preferably, a reinforcing band 11 is applied upon the outer face of the front wall of the container; said band is fixed to the front wall of the container by means of a vertical seal or of vertical lines of sealing point 12 and 14 (FIGURES 3 and 5). The sealing line 14 is close to the slit 8, on that side relatively to the slit which is not provided with the sealing line 10. The line of sealing points 12 is located at a certain distance from the edge 2 of the container 1. The reinforcing band is also sealed to the front wall along a horizontal line 13 (FIGURE 3) which also joins the lower edge of sheet 9 to the front wall of the container. The vertical lines of sealing points are intended to reinforce the container and also to allow the introduction of a feeding tube into the slit from that side alone where the sheet 9 is fixed (at 10) to the lip of the slit.

The reinforcing band 11 is then sealed at 15 (FIGURE 4) along its entire length together with the two edges 6 and 7 of the opening of the container and with the upper edge of the sheet 9, thereby closing the container on its fourth side.

The said band 11 has been shown with arcuate sides 16 and 17 (FIGURES 3 and 4), in order to facilitate the introduction of the feeding tube into the container and also to prevent the operator from passing his hands underneath the reinforcing band when lifting the container, which may tear the latter.

When filling the container, a feeding tube is inserted underneath the band 11, from the side 3, then through the lip 8 between the front wall 6 and the sheet 9, the said tube being pushed into the container sufficiently far, for its outlet to pass beyond the free edge of the sheet 9. The said feeding tube acts as a holder for the container. The substance to be packed into the container, for instance grains of fertilizer, is fed by means of compressed air or in any other manner through the tube into the container. When the container is nearly completely filled, it is moved away from the feeding tube and is tilted down. The substance inside the container presses then the sheet 9 against the front wall 6 of the container, thus producing a tight-fit closure of the container with regard to the substance contained therein.

The escape of air from the container during the filling operation may be effected by means of a small exhaust pipe coupled to the feeding tube or in any other convenient manner.

What I claim is:

A bag made of plastic material for holding a substance, having a casing with a slit cut down on part of the depth of the front wall of the casing, a sheet applied behind the slit against the said wall of the casing, said sheet being fixed along its entire width at one side edge and also at its upper and lower sides to said front wall of the casing and being left free relative to said front wall at that place where the slit has been cut and along its remaining surface on one side of the latter, thus allowing a passage for a tube into the bag through the slit to feed a substance into the bag, means for closing the bag at its upper part, and a band of plastic material applied upon the front face of the front wall of the casing, which band covers the slit and is fixed at its lower part on its entire length and is fixed at its upper part, towards the opening, jointly with the said means for closing the bag and with the said band, thus forming a thick upper edge which closes the bag with a tight fit and is highly resistant to tear.

References Cited in the file of this patent.

UNITED STATES PATENTS

| | | |
|---|---|---|
| 810,349 | Rogers | Jan. 16, 1906 |
| 2,682,902 | Metzger | July 6, 1954 |